DUAL LIFTERS FOR A RECORDING PEN

Filed Aug. 25, 1967 Sheet 1 of 3

INVENTORS.
LESTER R. LEIDY, JR.
PAUL A. ALDINGER
BY John Shaw Stevenson
AGENT.

INVENTORS.
LESTER R. LEIDY, JR.
PAUL A. ALDINGER
BY
John Shaw Stevenson
AGENT

INVENTORS.
LESTER R. LEIDY, JR.
PAUL A. ALDINGER
BY John Shaw Stevenson
AGENT.

United States Patent Office 3,441,945
Patented Apr. 29, 1969

3,441,945
DUAL LIFTERS FOR A RECORDING PEN
Lester R. Leidy, Jr., Oreland, and Paul A. Aldinger, Warminster, Pa., assignors to Honeywell Inc., Minneapolis, Minn., a corporation of Delaware
Filed Aug. 25, 1967, Ser. No. 663,252
Int. Cl. G01d *15/18*
U.S. Cl. 346—68 2 Claims

ABSTRACT OF THE DISCLOSURE

Dual lifters for use with a pen that is associated with a chart of a chart module that is pivotally mounted for removal from the chassis of a strip chart recorder, wherein the first lifter has a manually operated spring return push rod actuator that is positioned in either a non-latched position with the chassis of the recorder when it is desired to retain the pen in a recording position with the chart or in a latched position with the chassis when it is desired to retain the pen in a lifted off chart nonrecording position, a second one of the dual pen lifters is connected for movement with another latch releasably connecting the chart module to the recorder chassis to affect a lifting of the pen from a recording position with the chart as this latch is released and to restore the pen to its recording position when this latch is reengaged and wherein the dual lifters are interconnected by way of a lost motion connection in the form of spring biased pins in associated elongated slot connections to enable the actuations of the latch associated with the chart module to take place and the pen to remain in the lifted-nonrecording position with the chart when the push rod actuator is in its latched position.

It is an object of the present invention to disclose dual lifters for a pen that are comprised of a common link and a common shaft connected for movement with the link for rotation in either direction through an arc in an eccentric manner on a chassis to engage and to disengage the pen with a chart.

It is another object of the present invention to disclose a first lifter for a pen that has a spring return push rod actuated arm that can be independently latched into engagement with the chassis of a recorder in order to prevent a second lifter from lowering the pen into engagement with a chart when the chart and its associated module is removed from the chassis of the recorder.

Another object of the present invention is to provide spring biased pins in associated elongated slot connections for the aforementioned duel lifter parts to provide lost motion between these parts so that certain parts common to each of these pen lifters can be actuated by each lifter and to also prevent deviation in the manufacturing tolerances of the lifter parts from effecting the aforementioned pen lifting operations.

It is another object of the present invention to disclose the aforementioned pin and associated elongated slot connections in the pair of pen lifters parts so that pivots formed by these parts will establish their own centers and will not need to be adjusted or aligned.

It is another object of the invention to disclose the combination of a first pen lifter part to raise a pen from a chart in a recorder during periods when recording is not required or desired and an associated second independently actuated pen lifting part that removes the pen from the chart while a chart platen on which the chart is mounted is being removed from the recorder with the chart mounted thereon for observation or replacement.

A better understanding of the present invention may be had from the following detail description when read in connection with the following drawings in which.

Figure 1:
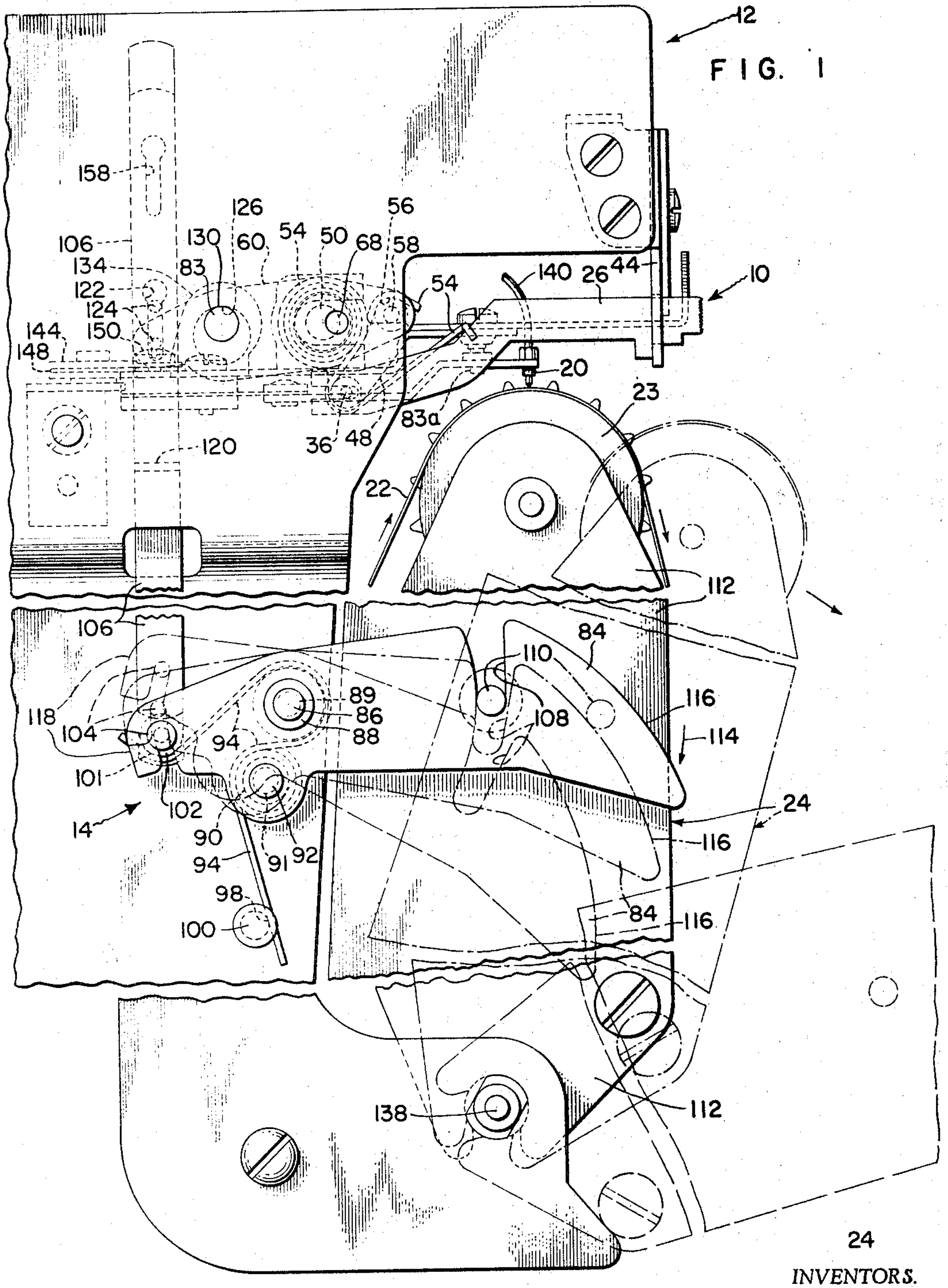
FIG. 1 is a side elevation view of the dual pen lifters and a partial side view of that portion of a recorder chassis on which the lifters are mounted.
Figure 2:
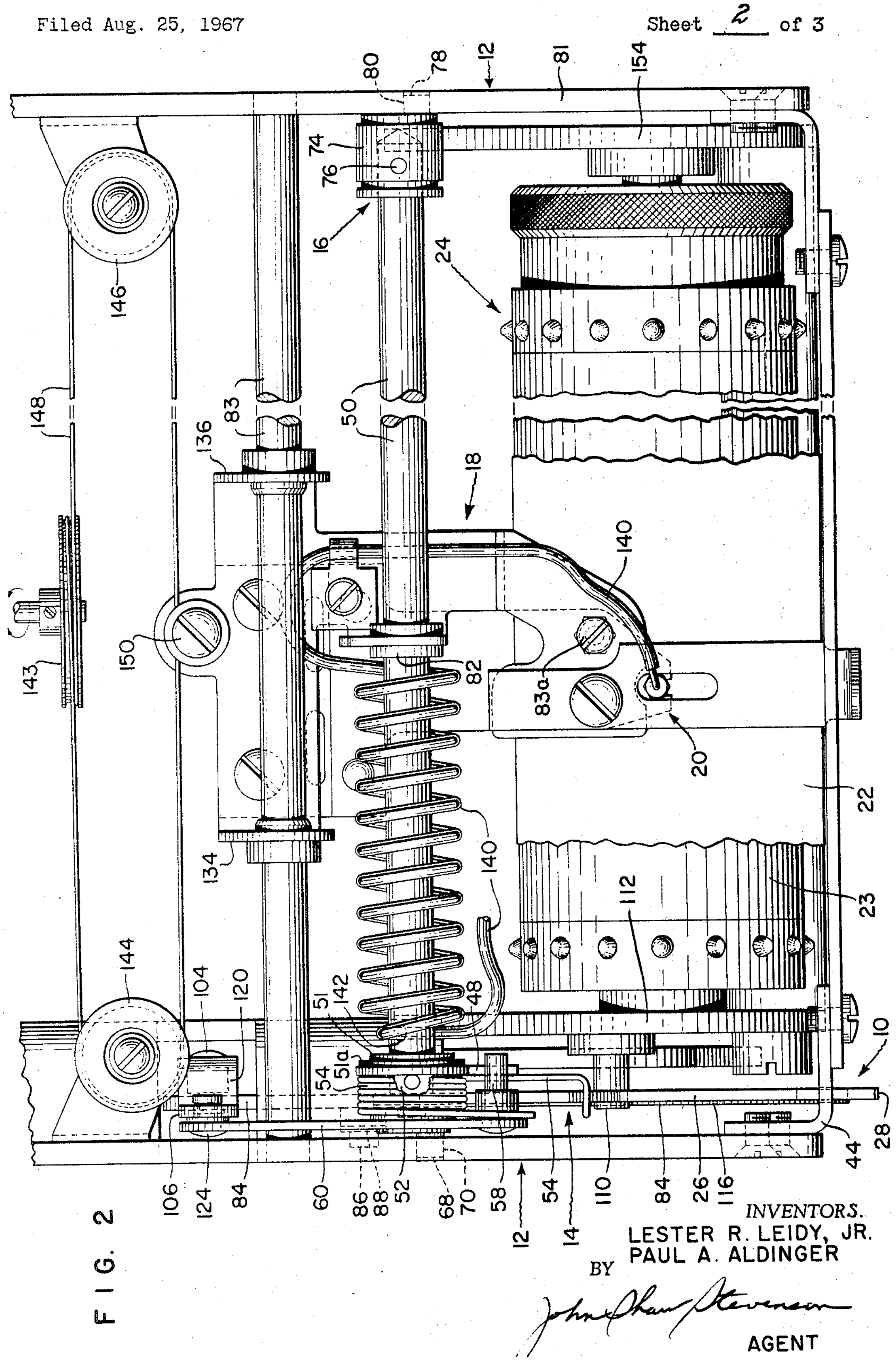
FIG. 2 is a plan view of the lifters showing how the lifters are connected to actuate a pen by means of a shaft eccentrically mounted on the chassis of the recorder.
Figure 3:
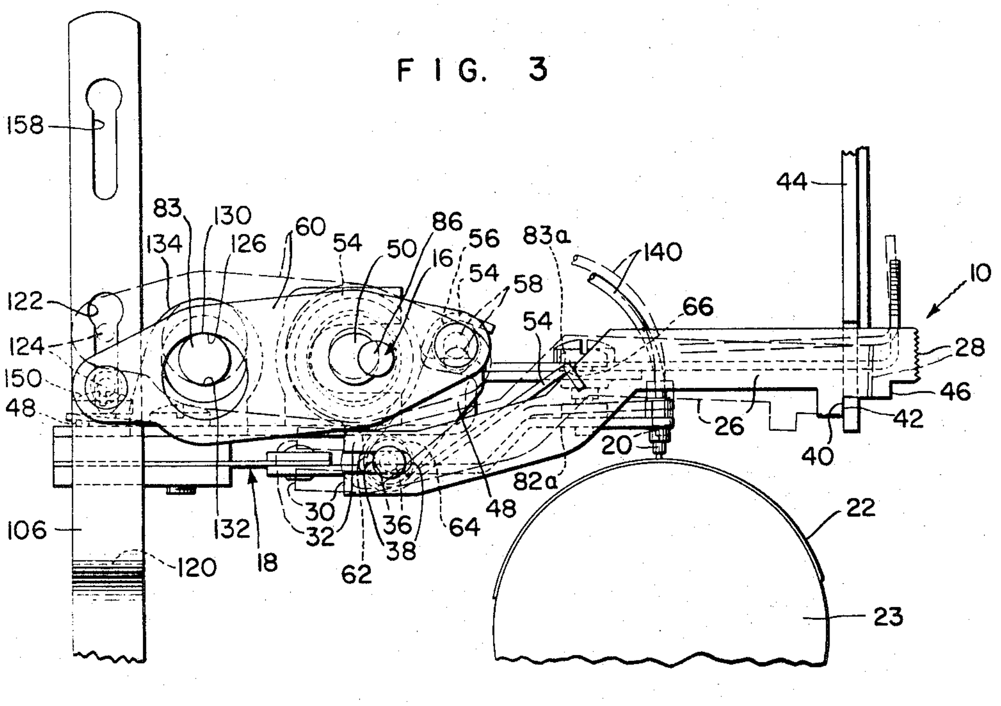
FIG. 3 is a side elevation view showing in dotted line form the position the push rod portion of the dual pen lifter will be in when it is in a latched position with the recorder chassis and the pen thereby moved into its raised, nonrecording dotted line position.

The dual lifting apparatus for a pen disclosed in FIGS. 1–3 is comprised of a first pen lifter portion 10 mounted on a chassis of a recroder 12, a second pen lifter portion 14, a rotatable unit 16 forming a part of each of the pen lifters 10, 14 eccentrically mounted for rocking movement on the chassis 12 and a carriage 18 connected for rocking movement to move a pen 20 into and out of engagement with a chart 22 of a chart roll 23 forming a chart module 24.

*First pen lifter*

The first lifter 10 as is best shown on FIG. 3 is comprised of a push rod 26 containing a knurled front end 28 and an opposite end that is of a forked shaped configuration that is formed by the two tangs 30, 32. The width of the slot formed by the inner surface of the two tangs 30, 32 is of a larger dimension than the pin 36 extending therethrough.

It can be seen that when the right end 28 of the push rod 26 is manually pushed in and it is moved from its solid line to its dashed line position that the wall 38 forming the right closed end of the slot will be brought into contact with one end of the pin 36 and thereafter move the pin 36 to its dotted line position. It can also be seen from observing FIG. 3 that during the aforementioned movement of the push rod 26 the lower side latching surface 40 will be moved inwardly away from the surface 42 of the part 44 forming a stationary part of the recorder and another inside latching surface 46 of the push rod 26 will be brought into engagement with the surface 42.

The other end of the pin 36 is fixedly connected to an outer portion of a crank arm portion 48 of the first pen lifter 10. The crank arm 48 in turn is loosely mounted on the embossed portion 51 of the shaft 50 and the horseshoe cotter **51*a* prevents the crank arm 48 from moving to the right along shaft 50**.

The left end portion of the shaft 50 is shown in FIG. 2 as having a cylindrical embossed portion 52 on which several coils of a torsion spring 54 are wrapped. The left end of the spring 54 is retained in spring biased engagement at 56 with one end of the pin shaft 58 that is fixed to and projects from a stop plate 60 in order to apply a downward spring force to the pin shaft 58. The other end of the pin shaft 58 in turn transmits the spring force it receives to its associated crank arm 48. The stop plate 60 in turn is fixedly connected to the left end of the shaft 50. The other end of the torsion spring 54 extends over and into spring biased engagement at 62 with an extended embossed portion 64 of the pin 36 that extends from the crank arm and thence into spring bias slidable hooked surface to surface engagement at 66 with the upper edge of the push rod 26. This will bias the rod 26 forwardly and downwardly as it is pushed in toward a latched position with the recorder chassis 12.

From the aforementioned description of the torsion spring 54 it can be seen that the spring 54 is used as a lost motion member to transmit push rod motion into unitary rocking motion of stop plate 60 and shaft 50.

FIG. 2 shows the left end of the stop plate 60 is provided with a pin shaft 68 fixedly mounted for rotation therewith and protruding outwardly to the left of the stop plate 60 and shown supported for rotation in a bearing 70 in the left side plate 72 of the recorder chassis 12.

The central longitudinal axis of the pin shaft 68 is offset from the central longitudinal axis of the shaft 50. The other end of the shaft 50 has a bushing 74 fixedly mounted thereon by means of a one or more roll pins, for example, pin 76.

The right end of the bushing 74 as is best shown in FIG. 2 has a pin shaft 78 integral therewith and protruding therefrom that is supported for rotation in bearing 80 in the right side plate 81 of the recorder chassis 12.

The longitudinal center line of the pin shaft 78 is axially aligned with the longitudinal axis of the pin shaft 68.

From the aforementioned description it can be seen that the shaft 50 and the longitudinal centerline thereof is thus connected to move in an eccentric rocking, arcuate fashion about the longitudinal center axis of the aligned pin shafts 68, 78 when the shaft 50 is rotated by the motion introduced by the push rod 26 of the first lifter 10 when it is moved from its solid line position to its dotted line position. When this action takes place the carriage 18 that is mounted on the shaft 50 by way of the bearing 82 and the pen 20 fixedly mounted on a spring supported portion **82*a* and the carriage 18 will also be simultaneously moved through an arc about the shaft 83 after the remaining portion of the carriage 18 is rotatably brought into contact with an adjustable lifting screw 83*a*. Movement of the screw 83*a* will, in turn, cause the pen 20 to be moved from its solid contacting position with the chart 22 to its dotted line position in which it is raised and out of contact with the chart 22**.

*Second pen lifter*

The second lifter 14 as is best shown in FIGS. 1 and 2 is comprised of a latch 84 that is mounted to pivot on and about a pivot pin shaft 86 that is fixedly attached to the recorder chassis 12. A cotter 88 is mounted in a groove 89 in the shaft 86 to prevent the latch 84 from moving sideways off the shaft 86.

Protruding from one side of the latch 84 there is a drum 90. The other end of the drum 90 has a pin portion 91 protruding through the latch 84 and retained thereon by peening over the outer end portion 92 of the pin 91.

Several turns of the torsion spring 94 are wrapped about the drum 90. As shown in FIG. 1 one end portion 96 of the spring 94 is retained in sliding engagement with the shank surface 98 of a button head pin 100 that is fixedly connected at its inner end to chassis 12.

As is best shown in FIG. 1 the other end portion 101 of the spring 94 is in spring bias contact with the lower surface 102 of a pin 104 that is fixedly mounted in a cantilever fashion for movement with a vertically positioned lever 106.

When the closed end of the wall 108 forming a slot in the latch 84 is retained in contact with the pin shaft 110 projecting from the sideplate 112 of the chart module 24 as shown in its solid line form in FIG. 1 the spring 94 will retain the latch 84 in this solid line position.

When a manual force is applied in the direction of the arrow 114 to the curved surface 116 by, for example, the thumb of the operator and against the bias of the torsion spring 94 to allow the pin shaft 110 and its associated chart module 24 to be pivoted outwardly from its solid line to its dash line position the shaft 110 will also be moved from its solid line position to its dashed line position and caused to roll along surface 116.

While the aforementionel action is taking place, the pin 104 and lever 106 will be forced by the action of the spring 94 acting on the spring portion 101 to move this pin 104 and lever 106 in an upward direction as the rear slotted out portion 118 of the latch is raised to its dotted line position.

The upper end of the lever 106 is bent at 120 and a wall portion 122 forms a slot therein.

A pivot pin 124 is fixedly connected at one end to the left end of stop plate 60 and is shown protruding through the slotted outwall portion 122.

*Recording pen position*

When the push rod 26 of the first pen lifter 10 is in its solid line position shown in FIG. 3 and the pin 110 in FIG. 1 is in its lowest (solid line portion) in the slotted wall portion 108 of latch 84 associated with the second pen lifter 14, then the pin 124, at the end of the stop plate 60, will be in contact with the lowermost portion of the slot formed by wall portion 122 of lever 106. Under this condition the top surface 126 of shaft 83 will be in contact with the upper surface of wall 130 that forms an aperture in the stop plate member 60 and the torsion spring 54 of the first pen lifter portion 10 will be able to apply its spring biasing force to pin shaft 58 of stop plate 60. Since the stop plate member 60 is fixedly connected to shaft 50 the force of torsion spring 54 under this condition will also retain the shaft 50 and the pen carriage bushing 80 mounted thereon in a rocked position in its eccentrically located pivot 70, 78 where the pen 20 will be in inking contact with the chart 22.

*Chart removal*

When the push rod 26 of the first pen lifter 10 is in its solid line position as is shown in FIG. 3 and the latch 84 of the second pen lifter 14 is depressed to its lowermost dotted line position so that the pin shaft 110 is free of the slotted wall 108 this action will allow the torsion spring 94 to apply its force to the under side of lever 106 to move it in an upward direction and the pin 124, mounted in the stop plate member 60, to be moved in an upward direction with the lever 106. This action causes the stop plate lever 60 and pin shaft 50 connected thereto to be moved through an arc in a clockwise manner until the lower surface of the wall 130 is brought into contact with the underside surface 132 of a stationary shaft 83. The shaft 83 has two bushings 132, 136 to slidably and rotatably support carriage 18 thereon. During the arcuate motion of the pen shaft 50 the pen carriage bushing 82 along with the carriage 18 and pen 20 mounted for arcuate movement with the pen shaft 83 will be moved in an arcuate direction. This action will thus cause the pen 20 to be moved away from contact with the chart 22.

As the pin 110 is moved as shown in the dotted line form in FIG. 1 along the curved surface 116 of the latch 84 when the chart module 24 is rotated from the solid to its dotted line position about the pivot pin 138 associated with the chassis the action of the torsion spring 94 will return the lever 106 and latch 84 and pen 20 to the positions these parts were in before the latch 84 was depressed.

Likewise when the chart module 24 is returned to its recording position the pen 10 riding on curved surface 116 will perform a pen lifting and lowering operation similar to that just described.

The aforementioned operations of the latch is for the purpose of allowing the chart module to be removed from and to be returned to its recording position by the dual lifter linkage just described. This is necessary in order that no undesired record will be recorded on the chart paper 22 during this chart removal and chart replacement operation.

When the push rod 26 of the first pen lifter 10 is in its dash line, latched in position shown in FIG. 3 and the latch 84 and the second pen lifter is depressed and then released as previously described the slotted wall portion 122 of the lever 106 will merely be slid upwardly then downwardly about the pin 124 on stop plate 60 without effecting any movement of the pin 124.

Under this condition, the pen 20 will thus remain in the out of recording contact position with the chart 22 that it was placed in when the push rod 26 of the first pen lifting portion 10 is moved to its dotted line position.

FIG. 2 discloses that the capillary tube 140 is connected at one end in a conventional manner to a reservoir, not shown. This capillary tube 140 is shown passing through a wall portion 142 forming an aperture in the pen carriage shaft 50 and connected to its other end to the pen 20.

FIG. 2 also shows how a conventional input rotatable shaft driven drum unit 143 and pulleys 144, 146 and a wire drive 148 can be attached by means of a screw clamp 150 to move the pen carriage 18 across a chart 22.

The chart 22 as shown in FIG. 1 passes over a sprocket wheel 152 that is mounted between two side plates 112, 154.

The additional slotted wall portion 158 is shown in the upper portion of lever 106 to which another pin of another push rod, not shown, which is similar to the pen 124 can be inserted when it is desired to install another pen lifter similar to the previously mentioned first pen lifter 10 and when the second pen is simultaneously employed to record another record on the chart 22.

It can be seen that when this other pen lifter is employed in this manner that either the pushing in action of the push rod 26 of the first pen lifter 10 or the pushing in action of the push rod, not shown, of this other pen lifter can raise the pen associated with the pushed-in rod away from the paper.

It can further be seen that this action can keep the pen or pens lifted from the chart in that position when latch 84 is pushed down to remove the chart module 24 from the recorder chassis 12.

When either one or both of the aforementioned push rods e.g. push rod 26 is not in a pushed-in position and downward movement of the latch 84 takes place this action will allow the pen associated with these rods to be removed from the chart in a manner similar to that previously described when the chart module is removed from the recorder chassis 12.

The embodiments of the invention in which an exclusive property or privilege is claimed are defined as follows.

We claim:

1. A pen lifting apparatus for a recorder having a pen mounted for simultaneous slidable movement with a carriage along a first shaft that is fixedly connected to the carriage of a recorder and along a chart of a chart module that is pivotally connected to the chassis, comprising:

a first independently operated pen lifter to move a pen through a fixed repeatable distance, comprising a crank shaft including a stop plate rotatably mounted as a unit on said chassis to rock the pen into and out of engagement with said chart, a wall forming an aperture in the stop plate, said first shaft being positioned to extend through said wall and in spaced relationship therewith, a crank arm rotatably mounted on said crank shaft, a pin extending from the stop plate at one end and having a portion thereof in surface contact with the crank arm at its other end, a drive pin extending from the crank arm, a push rod having stepped shaped end portions to retain it in a latched and unlatched position with the chassis, and a torque spring extending about the crank shaft and drive pin and terminating at its respective opposite ends in spring biased contact on said stop plate pin and with said push rod, another end of the push rod being operably connected to rock the drive pin, the crank arm, the stop plate by means of the spring, the crank shaft and pen out of contact with the chart as the push rod is moved between an unlatched into a latched position, and wherein the spring is further employed as a means to retain the push rod in its latched and unlatched position with the chassis, a second independently operated pen lifter comprising a latch mounted for simultaneous pivotal movement with the carriage on the chassis, said latch being operably connected to lift the pen from the chart and release the chart module from a latched position with the chassis without marking the chart when the latch is depressed against the bias of a biasing means in contact with the latch and to automatically return the pen to its associated carriage without marking the chart to the recording position with the chart and latch the chart module to the chassis when a protuberance on the chart module is engaged with the pen lifting latch.

2. The pen lifting apparatus defined in claim 1 wherein the spring is operatively arranged to allow push rod and crank arm overtravel while moving from said unlatched to said latch positions and without effecting additional end motion when the wall forming the aperture in the stop plate is physically moved into contact with the first shaft.

References Cited

UNITED STATES PATENTS 2,885,255 5/1959 Pignone ------------ 346—68

RICHARD B. WILKINSON, *Primary Examiner.*

JOSEPH W. HARTARY, *Assistant Examiner.*

U.S. Cl. X.R.

346—139